United States Patent Office 3,657,164
Patented Apr. 18, 1972

3,657,164
COPOLYMERS CONTAINING BLOWING AGENTS AND DERIVED FROM ALKENYL AROMATIC AND VINYL POLYSILOXANES AND PROCESS FOR THEIR MANUFACTURE
Horst Jastrow, Frankfurt am Main, and Werner Weber, Mainz, Germany, assignors to Farbwerke Hoechst Aktiengesellschaft vormals Meister Lucius & Bruning, Frankfurt am Main, Germany
No Drawing. Filed May 20, 1969, Ser. No. 826,276
Claims priority, application Germany, May 24, 1968, P 17 70 487.9
Int. Cl. C08f 33/02, 35/02, 47/10
U.S. Cl. 260—2.5 B                                   2 Claims

ABSTRACT OF THE DISCLOSURE

The invention relates to a process for the manufacture of thermoplastic copolymer beads containing blowing agents, said copolymers being derived from mixtures of from 70% by weight to 99.9% by weight of styrene, from 0% by weight to 30% by weight of acrylonitrile, acrylic- or methacrylic acid esters and from 0.01% by weight to 0.1% by weight of polysiloxanes containing vinyl groups, and to the products of this process used in the manufacture of cellular plastics.

The present invention relates to copolymers containing blowing agents and derived from alkenyl aromatics and vinyl polysiloxanes and to a process for their manufacture.

It has already been described that thermoplastic polymer beads containing blowing agents may be coated, prior to being foamed in an aqueous emulsion, with alkyl- or phenyl polysiloxanes in order to avoid agglomerations of pre-foamed beads. It has also been described that these polysiloxanes may be added prior to the polymerization to the monomer compounds used in the preparation of the thermoplastic polymers.

Now we have found that thermoplastic polymer beads containing blowing agents may advantageously be prepared by polymerizing monomer mixtures comprising from 70% by weight to 99.9% by weight of styrene and from 0% by weight to 30% by weight of acrylonitrile, acrylic- or methacrylic acid esters in an aqueous suspension in the presence of from 4% by weight to 12% by weight, calculated on the polymer final product, of one or more blowing agents with the addition of from 0.01% by weight to 0.1% by weight of polysiloxanes containing vinyl groups, which contain units of the formula

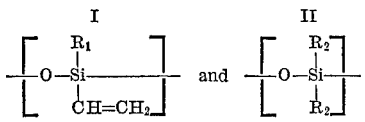

wherein $R_1$ and $R_2$ represent identical or different alkyl groups containing 1 to 4 carbon atoms, in a ratio I:II of from 1:4 to 1:50 and hydroxyl terminal groups and which have a mean molecular weight within the range of from 1000 to 5000.

In the case of polymer beads prepared in this manner, the drying period may be shortened by 50%, while lump formation does not take place in the process of pre-foaming the products. The polymers which can be dried more easily in accordance with the process of the invention and which, without additional finish, do not tend to form lumps in the pre-foaming process, contain the polysiloxane chains bound to the polymer. When using silicone oils of low molecular weight which contain vinyl groups, this bond is of great advantage when the cellular plastics obtained with these products are to be used in the foodstuff industries. The fractionated precipitation of benzenic polymer solutions yielded samples having approximately the same silicone content. The polysiloxanes containing vinyl groups are prepared by cohydrolysis of, for example, $Cl_2$—$Si(CH_3)CH=CH_2$ with $Cl_2Si(CH_3)_2$. The molecular weights lie within the range of from 1000 to 5000.

The copolymerization of the vinyl siloxanes with styrene or mixtures of styrene and acrylonitrile, acrylic esters or methacrylic esters is advantageously carried out in the presence of free radical-forming compounds in an aqueous suspension. As free radical-forming compounds there may be used peroxides such, for example, as dibenzoyl peroxide, dilauroyl peroxide, dicumyl peroxide, tert. butyl-peracetate or azo compounds such as azo diisobutyronitrile in concentrations of from 0.1 to 0.4 percent by weight, calculated on the mixture of monomers. As suspension stabilizers for the bead polymerization there may be used, for example, polyvinyl alcohol or methyl cellulose.

As blowing agents there may be used hydrocarbons containing 3 to 6 carbon atoms, for example n-pentane, iso-pentane, cyclopentane or halohydrocarbons containing 1 to 2 carbon atoms such as methyl chloride, methylene chloride or trichlorofluoromethane. The blowing agent may be added prior to or in the course of the polymerization in an amount within the range of from 4% by weight to 12% by weight, calculated on the polymer final product.

The polysiloxane containing vinyl groups may be added either to the monomers placed in the reaction vessel or it may be added together with the blowing agent prior to or in the course of the polymerization.

In addition to the silicone oils containing vinyl groups, there may be added to the polymerization mixture additives such as filling materials, dyestuffs or antistatic agents.

The following examples serve to illustrate the invention, but they are not intended to limit it thereto:

EXAMPLES

In a vessel having a capacity of 180 liters, 76 kg. of water and 78 kg. of styrene, 90 g. polyvinyl alcohol, 9 l. of pentane, 0.3% by weight of dibenzoyl peroxide and the vinyl polysiloxane shown in the table were polymerized at 90° C. After the product had cooled, it was washed in a continuously operating centrifuge and separated from the water. In a fluidized bed dryer, the material was dried with 3000 cu. m. of air circulating per hour, at 20° C., and the drying period up to a residual moisture of 0.05% by weight of water was several times determined to be 10 to 12 hours.

The dried material was prefoamed in a prefoaming device ("Lendle Vorschäumer VK 3"); 3 kg. of the polymer containing the blowing agent were filled into the device while stirrer and steam were simultaneously switched on. The height of the slide valve was adjusted to a maximum of 80 cm. The time of expansion denotes the time after which the first foamed beads ran over.

The table following hereunder shows the test results of the drying and pre-foaming processes. All products were subjected to the same drying and pre-foaming processes. In tests 4 to 11 polysiloxanes were used in which $R_1$ and $R_2$ each represents $CH_3$, while in tests 12 and 13 polysiloxanes were used in which $R_1$ and $R_2$ each represents $C_4H_9$.

TABLE.—VINYL POLYSILOXANE

| Example | Percent | Molecular weight | a/b | η, spec./c | Drying period (hr.) | Bulk density (g./l.) | Formation of lumps | Time of expansion (min.) | n-Pentane [1] |
|---|---|---|---|---|---|---|---|---|---|
| 1 | 0 |  |  | 1.0 | 10 | 23 | Yes | 3 | 6.0 |
| 2 | 0 |  |  | 0.98 | 11 | 25 | Yes | 3 | 5.9 |
| 3 | 0 |  |  | 0.95 | 12 | 23 | Yes | 3 | 6.1 |
| 4 | 0.02 | 2,000 | 1:4 | 0.97 | 6 | 23 | No | 3 | 5.8 |
| 5 | 0.04 | 3,000 | 1:4 | 0.97 | 6 | 23 | No | 3 | 6.0 |
| 6 | 0.08 | 1,000 | 1:4 | 0.95 | 7 | 23 | No | 3 | 6.1 |
| 7 | 0.02 | 2,000 | 1:9 | 0.95 | 6 | 23 | No | 4 | 6.0 |
| 8 | 0.09 | 3,000 | 1:9 | 0.98 | 6 | 24 | No | 3 | 5.9 |
| 9 | 0.05 | 2,000 | 1:30 | 0.99 | 6 | 23 | No | 3 | 6.2 |
| 10 | 0.10 | 4,000 | 1:45 | 1.00 | 6 | 23 | No | 3 | 6.0 |
| 11 | 0.10 | 5,000 | 1:50 | 1.00 | 5 | 23 | No | 3 | 6.1 |
| 12 | 0.05 | 3,000 | 1:4 | 0.95 | 5 | 23 | No | 3 | 6.0 |
| 13 | 0.10 | 3,000 | 1:9 | 0.90 | 6 | 23 | No | 3 | 6.1 |

[1] Content of blowing agent in the dry polymer.

We claim:

1. Process for the manufacture of thermoplastic copolymer beads containing blowing agents, which comprises polymerizing monomer mixtures comprising from 70% by weight to 99.9% by weight of styrene and from 0% by weight to 30% by weight of acrylonitrile, acrylic- or methacrylic acid esters in aqueous suspension in the presence of from 4% by weight to 12% by weight, calculated on the polymer final product, of one or more blowing agents and from 0.01% by weight to 0.1% by weight of polysiloxanes containing vinyl groups, which contain units of the formula

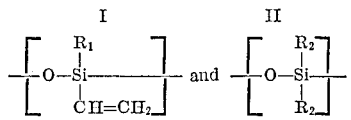

wherein $R_1$ and $R_2$ represent identical or different alkyl groups containing 1 to 4 carbon atoms, in a ratio I:II of from 1:4 to 1:50 and hydroxyl terminal groups and which have a mean molecular weight within the range of from 1000 to 5000.

2. Copolymer beads, containing blowing agents, derived from 70% by weight to 99.9% by weight of styrene, 0% by weight to 30% by weight of acrylonitrile, acrylic ester or methacrylic ester and 0.01% by weight to 0.1% by weight of a vinyl polysiloxane, which contains units of the following structure

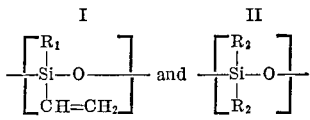

wherein $R_1$ and $R_2$ represent identical or different alkyl groups containing 1 to 4 carbon atoms, in a ratio I:II of from 1:4 to 1:50 and hydroxyl terminal groups and which have a mean molecular weight within the range of from 1000 to 5000.

References Cited

UNITED STATES PATENTS

| | | | |
|---|---|---|---|
| 2,742,378 | 4/1956 | Grotenhuis | 260—827 |
| 3,086,885 | 4/1963 | John | 260—2.5 B |
| 3,505,253 | 4/1970 | Finestone et al. | 260—827 |

FOREIGN PATENTS

| | | | |
|---|---|---|---|
| 706,934 | 3/1965 | Canada | 260—2.5 B |

SAMUEL H. BLECH, Primary Examiner

W. J. BRIGGS, SR., Assistant Examiner

U.S. Cl. X.R.

260—2.5 HB, S, 33.6 PQ, SB, 33.8 SB, UA, 46.5 U, 88.1 R, 93.5 W, 827